(No Model.)
J. F. WILLSON.
STEAM CANNING AND COOKING MACHINE.
No. 560,336. Patented May 19, 1896.
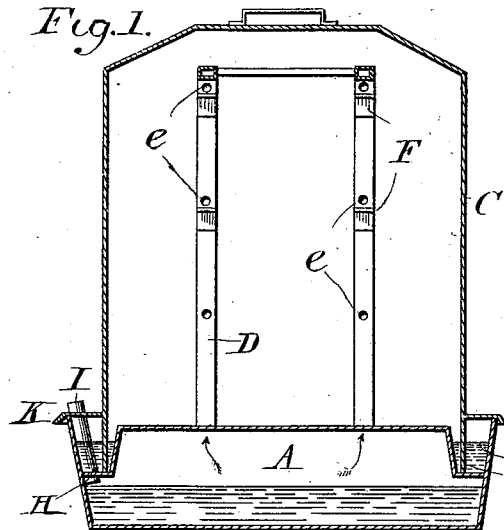
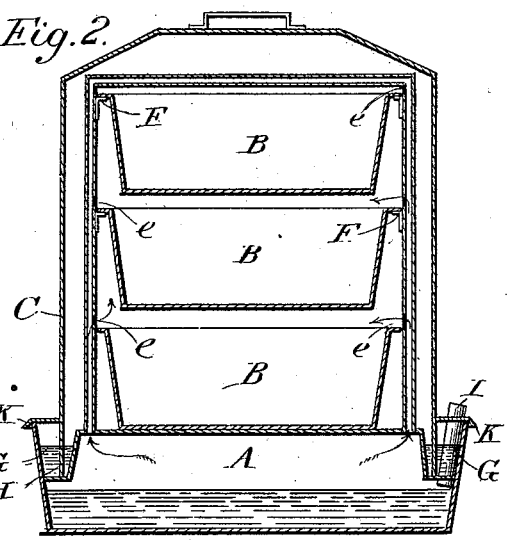
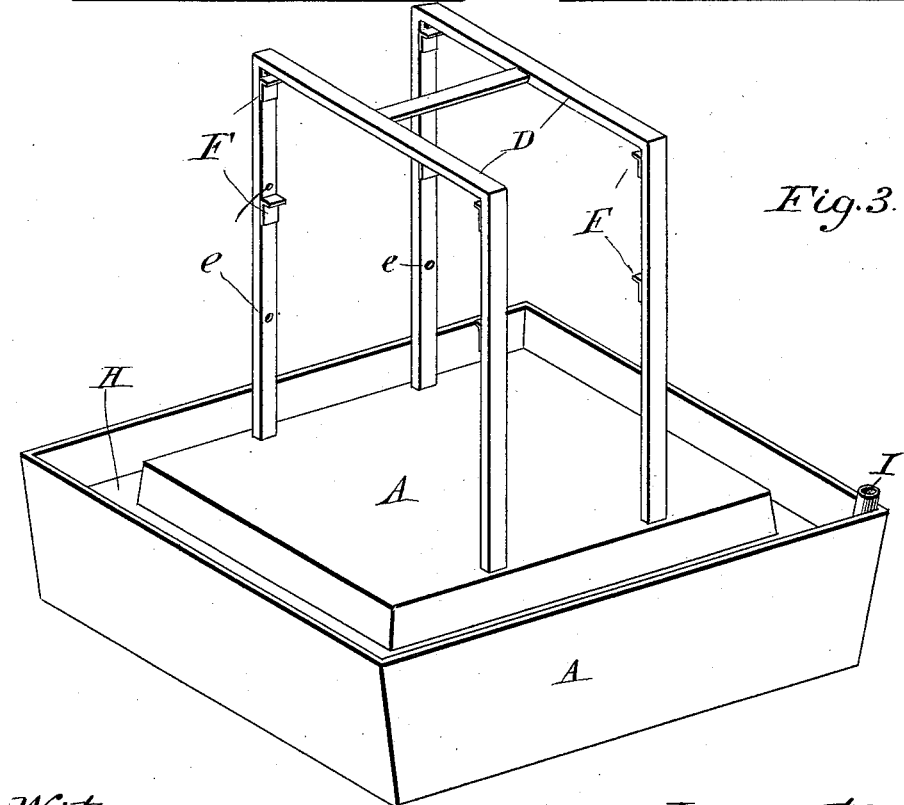
Witnesses:
H. C. Priest
H. A. Sommers
Inventor:
John F. Willson

# UNITED STATES PATENT OFFICE.

JOHN F. WILLSON, OF KISSIMMEE, FLORIDA.

STEAM CANNING AND COOKING MACHINE.

SPECIFICATION forming part of Letters Patent No. 560,336, dated May 19, 1896.

Application filed June 19, 1894. Serial No. 515,076. (No model.)

*To all whom it may concern:*

Be it known that I, JOHN F. WILLSON, a citizen of the United States, residing at Kissimmee, in the county of Osceola and State of Florida, have invented a new and useful Steam Canning and Cooking Machine, of which the following is a specification.

The special object of the invention is to improve steam-cookers for canning purposes, as hereinafter described and claimed.

Figures 1 and 2 of the drawings are vertical sections at right angles to each other; Fig. 3, a perspective view of the cooker.

In the drawings, A represents the steam-generator; B, the cooking vessels; C, the outer casing, which is water-sealed in a trough G on top of the generator, so as to render it steam-tight, and D the steam-distributing pipes, which have lugs F on the inside to support the cooking vessels and steam-escape orifices $e$ at different heights on the inside, so that the steam-jets may be directed into the cooking vessels.

K is a flange extending from the case C over the outer edge of the trough, while the bottom H of the case rests upon the bottom of the trough.

I is a filling-tube.

Having thus described all that is necessary to a full understanding of my invention, what I claim as new, and desire to protect by Letters Patent, is—

A steam-cooker consisting of a steam-generator, an outer case water-sealed in a trough on the top thereof, and steam-distributing pipes apertured at different heights, the said pipes being provided with inside lugs to support the cooking vessels, all substantially as shown and described.

JOHN F. WILLSON.

Witnesses:
V. P. KELLER,
RUBY ROSE.